United States Patent [19]
Cucchi

[11] Patent Number: 5,066,185
[45] Date of Patent: Nov. 19, 1991

[54] BAR FEEDER

[75] Inventor: Giovanni Cucchi, Bussero, Italy

[73] Assignee: Cucchi Giovanni & C. S. R. L., Bussero, Italy

[21] Appl. No.: 438,963

[22] Filed: Nov. 20, 1989

[30] Foreign Application Priority Data

Nov. 21, 1988 [IT] Italy .................. 22680 A/88

[51] Int. Cl.⁵ .................. B23B 13/08; B23Q 5/22
[52] U.S. Cl. .................. 414/18; 198/746; 198/748
[58] Field of Search .................. 198/737, 746, 748; 414/18, 144/245 R, 245 E; 29/2.15, 2.18, 263, 266; 82/89, 90; 83/207, 278, 437

[56] References Cited

U.S. PATENT DOCUMENTS

| | | | |
|---|---|---|---|
| 3,612,298 | 10/1971 | Azuma | 414/18 X |
| 3,955,687 | 5/1976 | Flisch | 414/18 |
| 4,407,176 | 10/1983 | Link | 414/18 X |

FOREIGN PATENT DOCUMENTS

| | | |
|---|---|---|
| 228063 | 11/1910 | Fed. Rep. of Germany . |
| 1477278 | 2/1969 | Fed. Rep. of Germany . |
| 1752698 | 10/1976 | Fed. Rep. of Germany . |
| 3634364 | 4/1988 | Fed. Rep. of Germany . |
| 2092657 | 1/1972 | France . |
| 581000 | 10/1976 | Switzerland . |

Primary Examiner—Robert J. Spar
Assistant Examiner—Janice Krizek
Attorney, Agent, or Firm—Young & Thompson

[57] ABSTRACT

A bar feeder for machine tools, comprising at least first and second carriages for bearing the bars, the carriages being movable along guide rods which are supported at their ends so as to freely oscillate with the carriages and the bar. The guide rods bear the carriages by sliding bushes which maintain the bars parallel and at a suitable distance from one another during oscillations. A supplementary bar guide comprising a bar pushing member is supported between a position coaxially arranged with the supporting carriages and a side or underlying position.

6 Claims, 6 Drawing Sheets

BAR FEEDER

BACKGROUND OF THE INVENTION

This invention relates to a bar feeder for machine tools, in particular for latches and similar machines, of the type in which the bars are supported in a rotating manner and are guided towards the machine tool by carriages moving along longitudinal guides.

In feeders of the aforementioned type there is the problem of reducing the high level of noise caused by the carriages jolting against the guides due to the vibrations generated by the bars when rotating rapidly.

In the past, attempts have been made to at least partially eliminate this inconvenience by fixing the guides rigidly with a material suitable for partially damping or absorbing the vibrations, and providing the sliding runners of the carriages with a similar material.

Nevertheless the results achieved, even if they did enable the noise of the bar feeders of the aforementioned type to be reduced in part, are not completely satisfactory since the vibrations generated by the rotation of offset parts of the bars are in any case transmitted by the carriages to the slide guides and by the latter to the support structure, still causing a considerable amount of noise.

An object of this invention is to provide a bar feeder, of the aforementioned type, by means of which it is possible to substantially reduce the noise caused by the vibrations generated by the bars during rapid rotation, at the same time enabling the bars to be guided gently and safely to the mandrel of the machine tool.

A further object of this invention is to provide a bar feeder as stated above, having auxiliary bar guide means for an additional push member and/or for lengths of rods, or for elongated parts having relatively small longitudinal dimensions, for example for shafts or the like which have to undergo head machining, for which guiding in the end section of the feeder may be less critical compared to bars of greater dimensions.

From tests carried out it was found that a considerable reduction in noise of the feeder is obtained by allowing the carriage and support guide assembly to freely oscillate, at the same time maintaining the guides parallel to one another and uniformly spaced apart by means of the carriages themselves. In this way the vibrations caused by the eccentric rotation of the bars are absorbed by the free oscillations of the guides without causing excessive jolting and noise.

SUMMARY OF THE INVENTION

The above mentioned objects may be achieved by a bar feeder according to the invention comprising: a support structure having a longitudinal axis, and slide guides for at least a first and a second carriage rotatably supporting a bar to be fed forward and guided towards a machine tool mandrel, said slide guides for the carriages comprising at least a first and a second guide rod parallelly arranged to the longitudinal axis of the feeder, said guide rods being supported at their ends by said structure to freely oscillate under centrifugal forces generated by the rotation of the bars in the carriages, each said carriage comprising sliding sleeve members secured to the carriage body to maintain said guide rods substantially parallel and spaced apart during the vibrations.

BRIEF DESCRIPTION OF THE DRAWINGS

The bar feeder according to this invention and some of its characteristics are to be illustrated in greater detail as follows with reference to the enclosed drawings, where.

DESCRIPTION OF THE INVENTION

Figure 1:
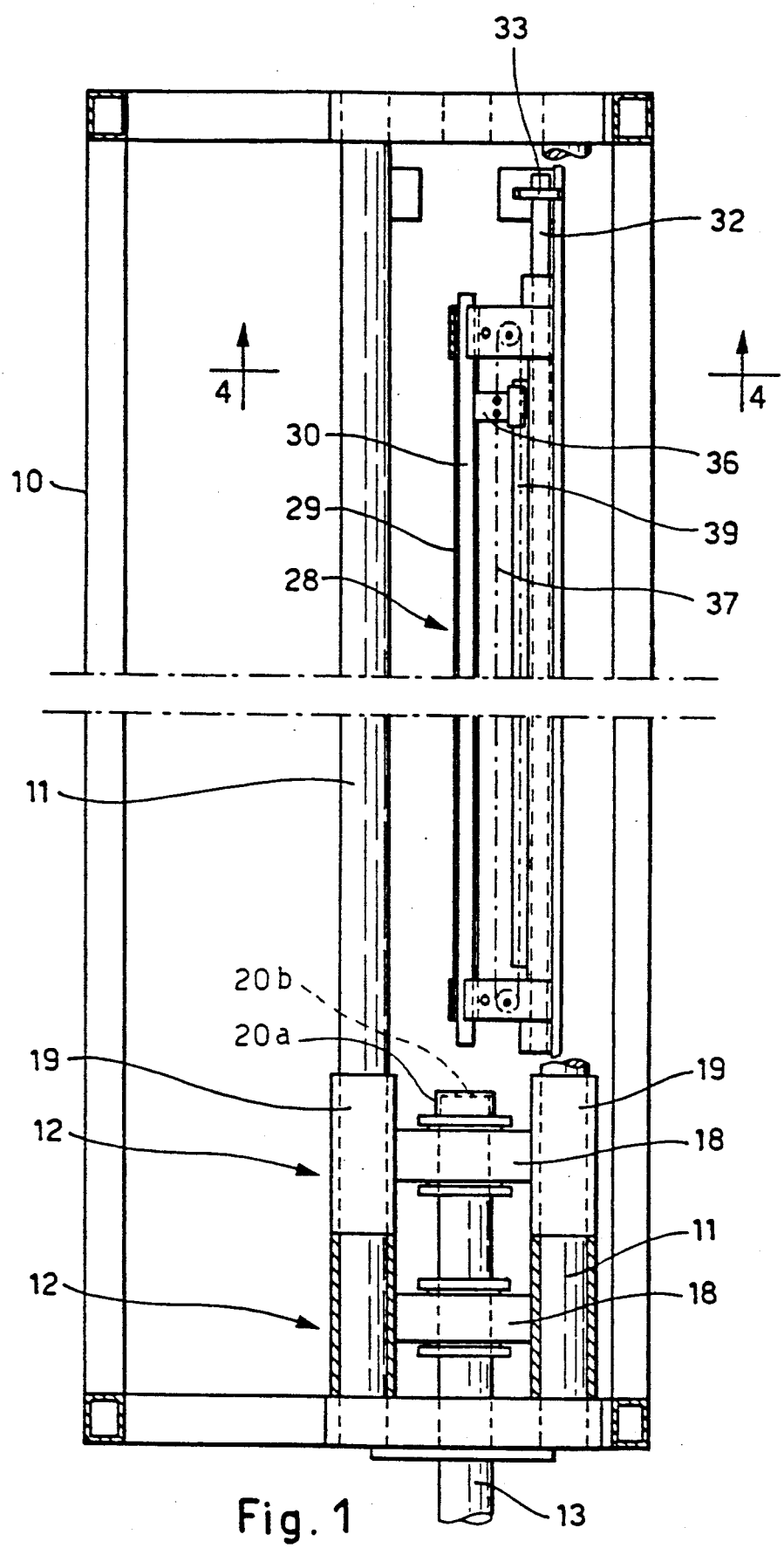
FIG. 1 is a top view of a feeder according to the invention.

FIG. 1 shows an overall view of a bar feeder according to the invention. The feeder comprises a support structure 10 for three guide rods 11 positioned at the apices of a triangle, only two being shown in FIG. 1, and along which slide two carriages 12 for supporting a bar 13 which has to be fed to a machine tool mandrel.

Figure 3:
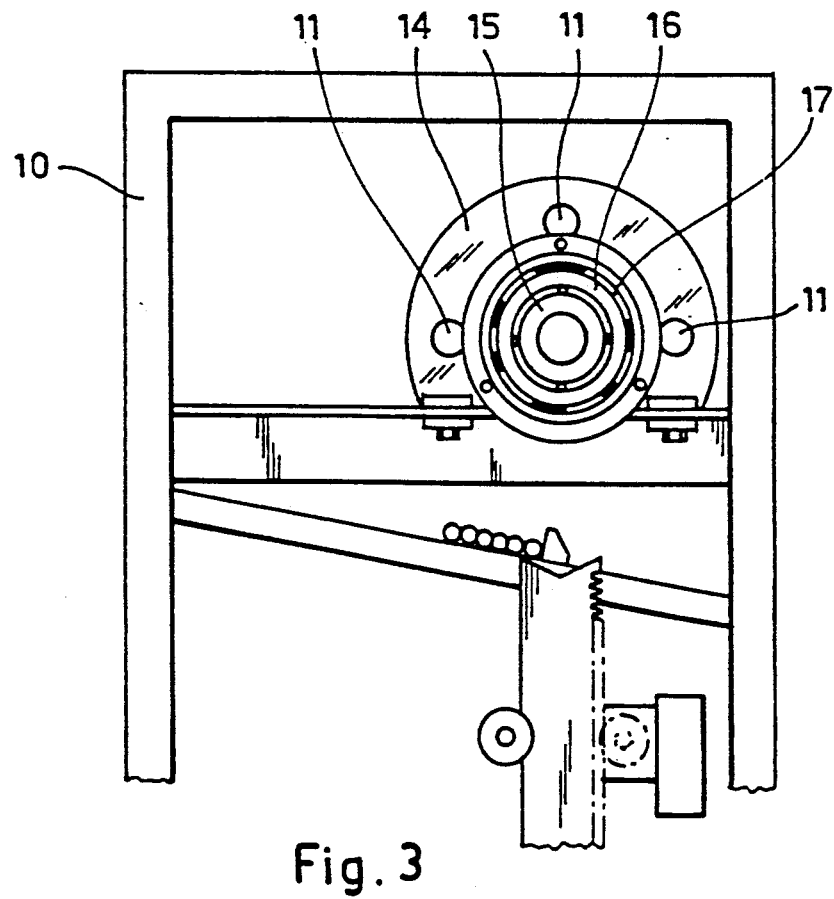
FIG. 3 is an end view of the feeder, along the line 3—3 of FIG. 2.

The guide rods 11 for the carriages are suitably fixed to the structure 10 in order to enable them to oscillate freely together with the same carriages. This can be achieved, as shown for example in FIG. 1, by fixing the guide rods 11 only at their ends to two backing plates 14, FIG. 3, bolted to the structure or frame 10 of the feeder. One of the plates 14, and in particular the plate shown in FIG. 3, which is on that side of the feeder turned towards the mandrel of the machine tool, is provided with a bar guiding means comprising a bush member 15 of elastomeric material, having a low frictional coefficient, supported in a rotating manner by a bearing 16 which is in turn fixed to the plate 14 by the interposition of a rubber ring member 17 or another part suitable for absorbing vibrations.

Figure 5:
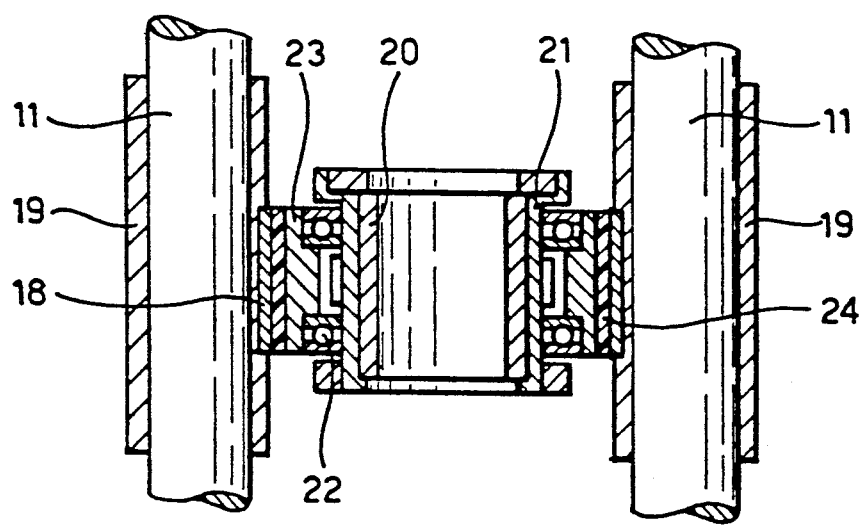
FIG. 5 shows an enlarged sectional view of a bar bearing carriage.

In order to enable the carriages 12 to run along the guide rods 11 and to freely oscillate together with the rods themselves, maintaining the latter uniformly spaced apart from each other with a disposition substantially parallel to the longitudinal axis of the structure 10, or the axis of the mandrel of the machine tool, each carriage comprises a central body 18, for example circular in shape, to whose periphery sliding sleeve members 19 are fixed, one for each of the guide rods 11. As shown in FIG. 5 the body 18 of each carriage 12 comprises a central bush member 20 having the same diameter or cross-dimensions and shape as the bar 13, which bush 20 is interchangeably placed in an intermediate bush member 21 in turn supported in a rotating manner by bearings 22 and by a ring 23 fixed to the body 18 of the carriage by the interposition of an annular pad 24 of elastomeric material, for damping and deadening the vibrations. The bush 20 of the rear carriage 12 differs from the bush 20 of the front carriage in that it protrudes or extends to the rear of the body 18, with an annular cup member 20a having a reduced aperture or hole 20b to enable the bar 13 to be pushed forwards by the carriage and at the same time to insert a supplementary push member 30, having a diameter smaller than that of the bar.

The guide sleeves 19 of each carriage run without play along the guide rods 11 in such a way that each carriage unit 12 and the guide rods 11 form a single assembly capable of oscillating, without jolts or collisions occurring between the parts which otherwise might cause noise. In this way the vibrations generated by a possible eccentric rotation of a bar 13 or part of it, are transmitted by the carriages 12 to the guide rods 11 which, due to their possibility to freely oscillate in relation to the support structure 10, completely absorb said vibrations. In this way an extremely quiet feeder structure is obtained which at the same time ensures gentle and safe guiding of the carriages since the latter act on the guide bars 11 to guarantee and maintain their parallel disposition.

Figure 2:
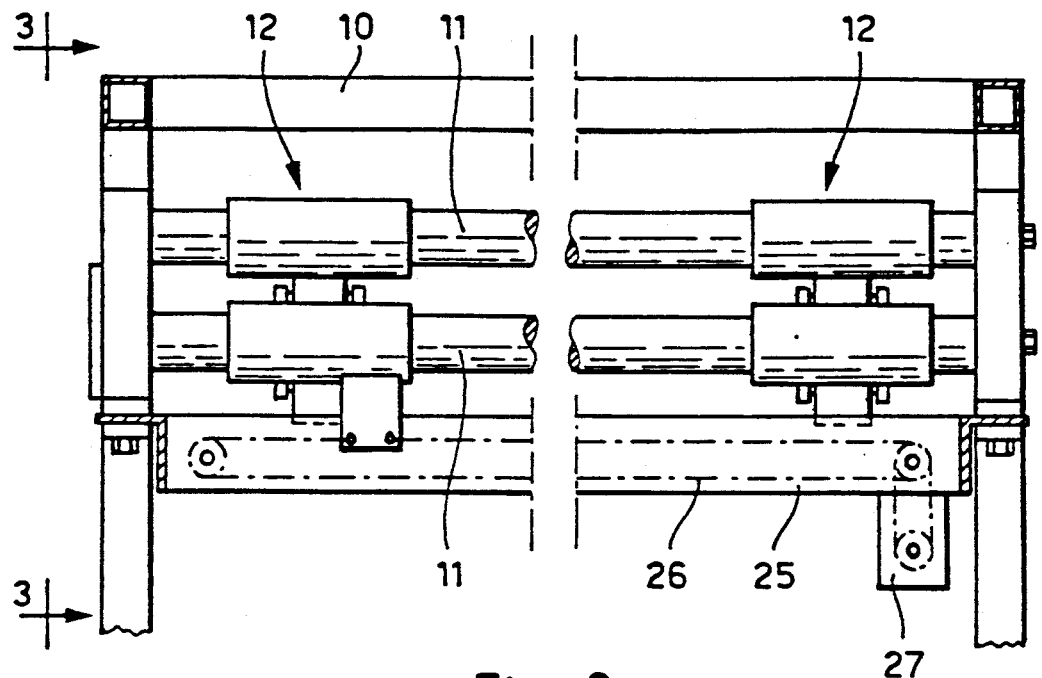
FIG. 2 is a side view of the feeder of FIG. 1, with some parts removed.

The carriages 12 of the feeder are moved independently along the guide bars 11, for example by a respective chain control means illustrated schematically by 25 in FIG. 2. Said control means substantially comprises an endless chain 26 having one side fixed to the carriage 12 and driven by an electric motor 27.

According to a further characteristic of this invention the bar feeder comprises a supplementary movable guide device 28 provided with a push member which intervenes to move the bar 13 forward towards the interior of the machine tool mandrel, in the final portion of its forward stroke; if required, this guide 28 may be used for supporting and introducing into the carriages 12, when the latter are completely forward as shown in FIG. 1, a shorter length of rod or elongated parts which have to be head machined, for example a shaft or the like.

This supplementary guide, indicated overall by 28 in FIG. 1 comprises a tubular member 29 having a longitudinal slot which extends parallel to the bar 13 to be fed, in which a pushing member 30 is longitudinally movable inside said tubular part. The tubular member 29 is supported by a pair of side arms 31 fixed to a rotatable axle 32; the axle 32 is carried rotatably by the structure 10 and is connected to a toothed wheel 33 (FIG. 4) which engages with a rack 34 driven by a control cylinder 35.

Figure 4:
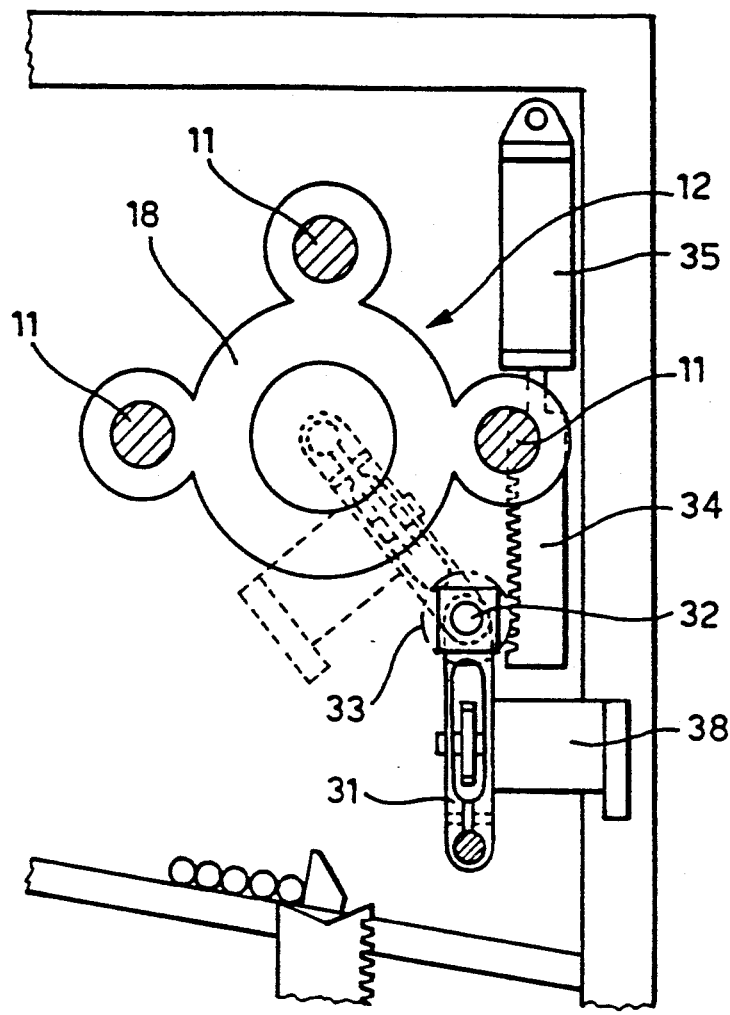
FIG. 4 shows an enlarged detail taken along the line 4—4 of FIG. 1.

The pushing member 30, in the shape of an elongated stem, is connected to a shank 36 protruding from the longitudinal slot in the guide tubular member; the shank 36 is connected to an endless chain 37 operatively connected to a driving motor 38 (FIG. 4). Therefore the assembly of the tubular guide member 29, the pushing member 30, the chain 37 and the driving motor 38 is supported in a rotatable manner between a lowered position, shown in an unbroken line in FIG. 4, in which the movement of the carriages 12 does not interfere with the supplementary guide, and a raised position, indicated by a dotted line in FIG. 4, in which the supplementary guide member 29, with the relative pushing member 30, are axially aligned to the bar 13 supported rotatably and slidably by the carriages 12 of the feeder. If required, the shank 36 of the pushing member can be guided in its travel by a hollow guide 39 fixed to the rotatable axle 32, which also serves for the passage of the return run of the endless chain 37.

Figure 6:
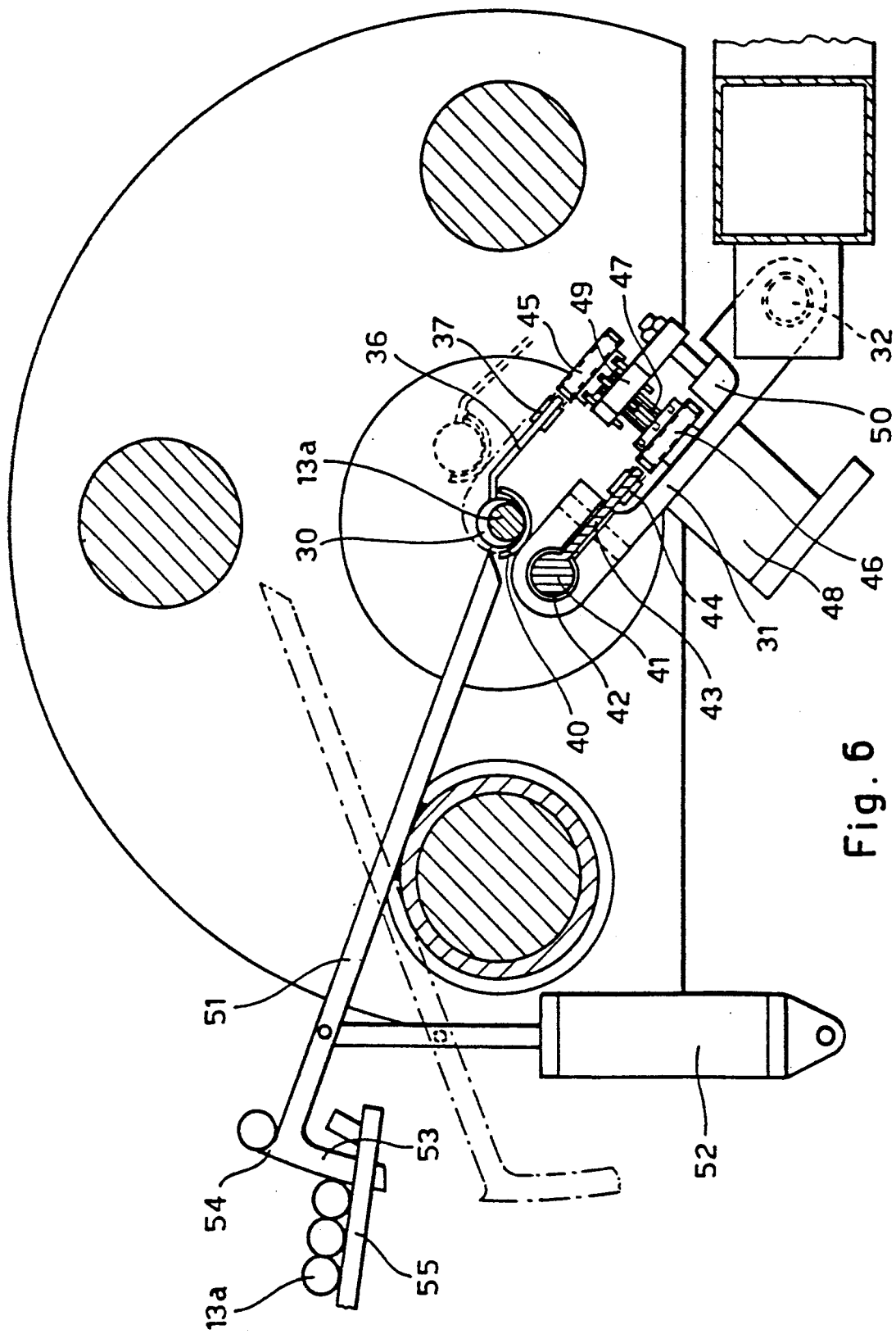
FIG. 6 is a cross sectional view showing a further solution of an additional movable guide device comprising a double pushing device.

FIG. 6 of the enclosed drawings shows a variation of the supplementary movable guide according to this invention. In the case described previously, the guide was in the form of a tubular member and comprised of a pushing stem having a greater length than the tubular guide, so as to enable the bar 13 to be fed for the whole length of the machine tool mandrel to which the feeder is connected. Unlike the previous case, the guide member in FIG. 6 is now in the form of a semicircular cradle 40, fixed on one side to swingable arms 31. The semicircular cradle 40 serves as a guide both for the first pushing member 30, which in this case is shorter in length than the previous one, and for a bar length 13a or another extended element which has to be fed, to move it forward through the guide carriages 12 into the position shown in FIG. 1, towards and inside the mandrel of the machine tool. The pushing member 30 is again connected by means of a side arm 36 and chain drive 37 in the manner explained previously.

Laterally to the cradle guide 40, the device comprises a second pushing member 41 sliding in a second tubular guide 42 carried by the arms 31. In this case too the second pushing member 41 has a greater length than the tubular guide 42 and the pushing member 30 in order to intervene subsequently where the latter has left the bar 13a. The pushing member 41 is connected by a shank 43 to a chain drive 44; the two chain drives 37 and 44 engage with the respective toothed wheels 45 and 46 idly supported by a splined shaft 47 connected to a driving motor 48. The two toothed wheels 45 and 46 can be selectively connected to the splined shaft 47 by means of a double pinion 49 sliding along the shaft 47 and driven by a control cylinder 50; the pinion 49 has on its two sides a set of dowels which engage in corresponding lateral holes of the two toothed wheels. In this way, having in the same space two pushing members for the bars, it is possible to obtain forward travel of the bars having a length equal to or greater than that of the feeder structure.

In this case too, the supplementary guide assembly can be moved between at least two operating positions as shown in FIG. 6, and more precisely between a first operating position in which the cradle-shaped guide 40 and the first pushing member 30 are axially aligned with the carriages 12 of the feeder, and a lateral position, shown by a dotted line in FIG. 6, in which the second pushing member 41 is in this case aligned with the bar 13a so that it intervenes subsequently to the previous one. It is clear that, with suitable driving means, the movable guide assembly can be made to rotate both in the operating positions described previously and in a resting position with the guide assembly completely lowered to enable the carriages 12 of the feeder to slide.

51 in FIG. 6 indicates an automatic loader for feeding bars 13a to bar feeder 10, the loader is in the form of spaced apart rocking levers 51 driven by a fluid actuated cylinder 52; each lever 51 extends towards the guide 40 and, at its end remote from the cradle or duct shaped guide 40, has a transverse L-shaped head 53 having a pointed or tip-shaped upper protrusion 54 to take, one by one, the bars 13a carried by an inclined plane or supporting members 55.

Figure 7:
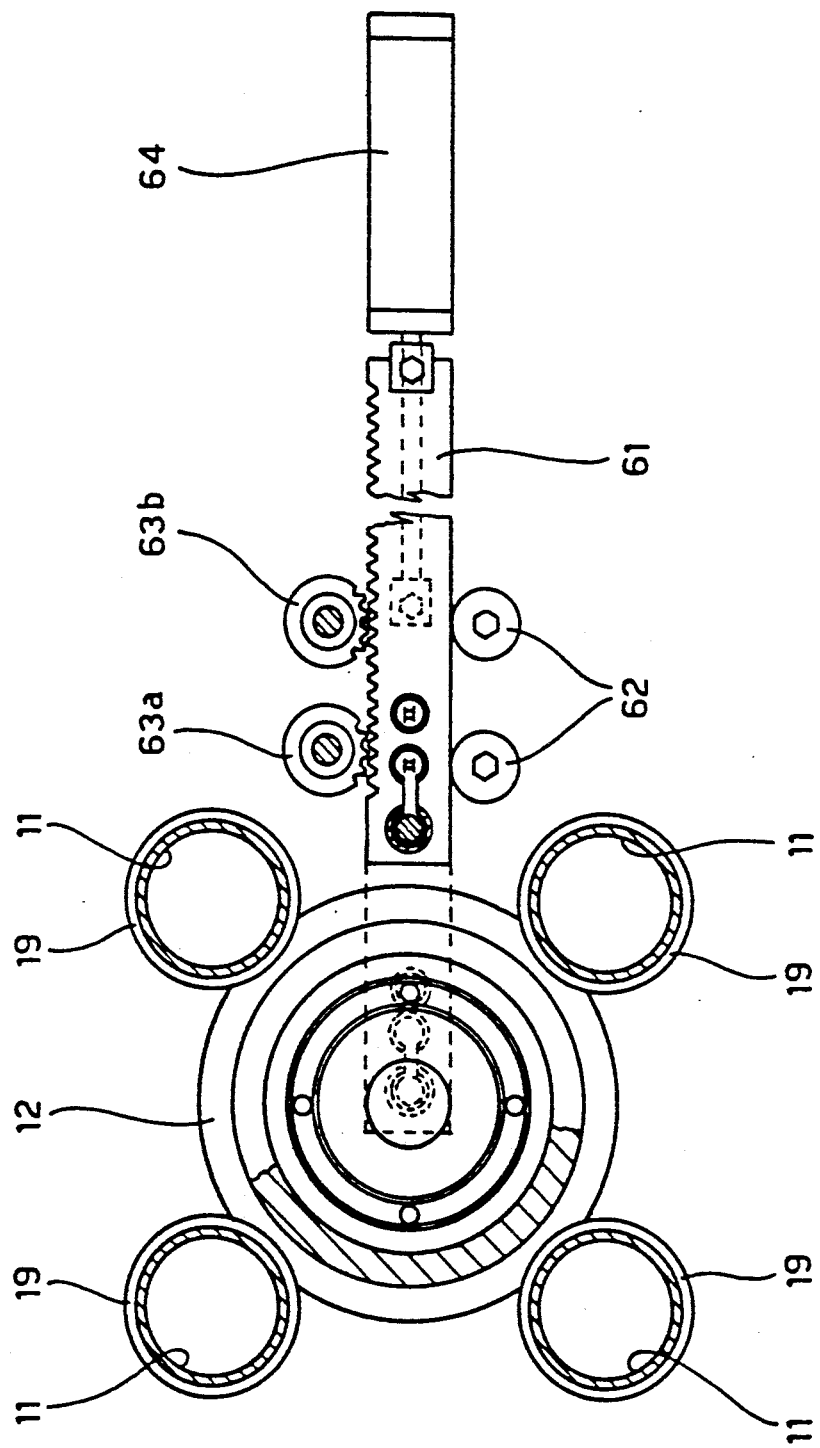
FIG. 7 is a cross sectional view of a further embodiment of the bar feeder according to this invention.
Figure 8:
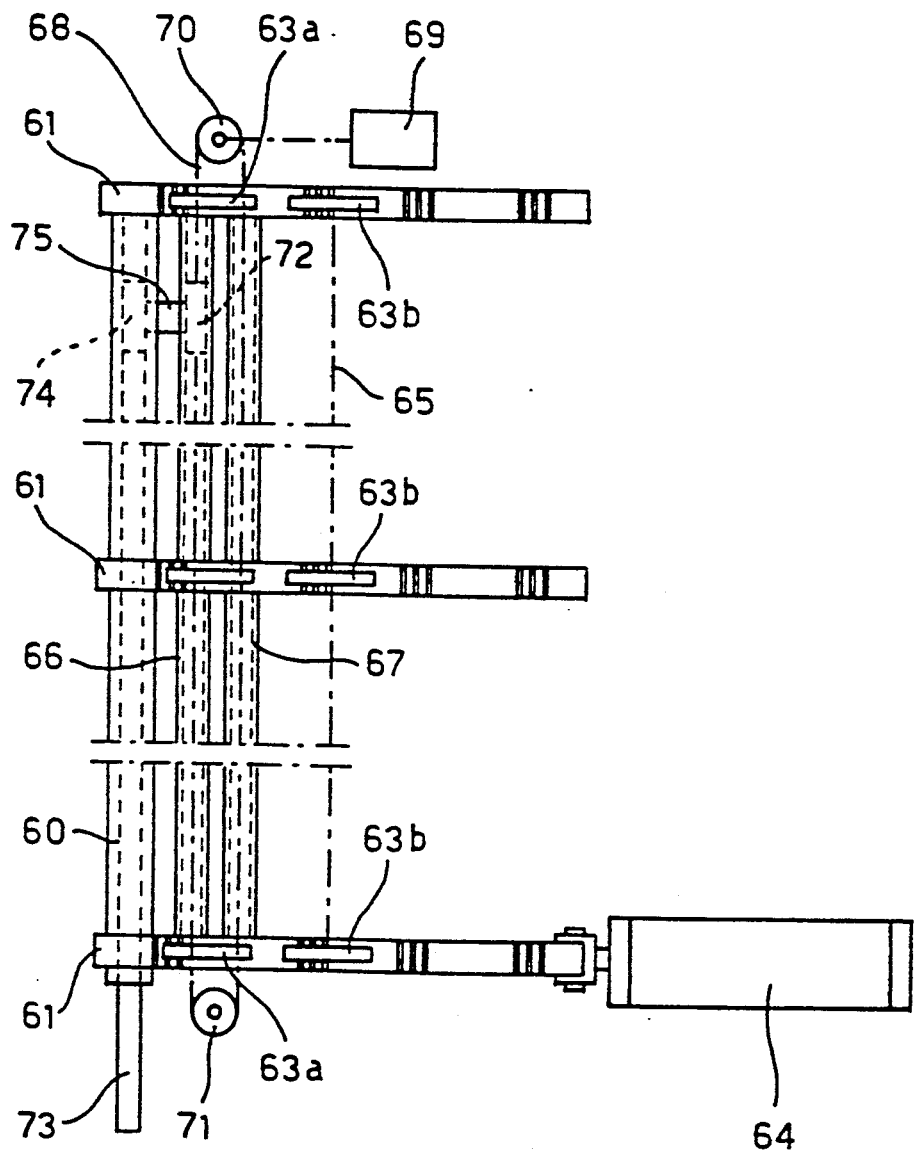
FIG. 8 is a top view of the devices for guiding and pushing the bars shown in FIG. 7.

FIGS. 7 and 8 of the drawings show a further embodiment of a device for feeding bars according to the invention, particularly suitable for feeding heavy or large rods. In this case the carriages 12 have four guiding sleeves 19 sliding along four tubular guide rods 11, parallely arranged at the apices of a square. The use of four guide rods 11 enables bars 13 of greater dimensions to be supported and fed, nevertheless the presence of four guide rods means that in this case a guide and pushing device cannot be adopted; in fact the lower rods would prevent the device from rotating inwards.

Therefore this manner of construction envisages a tubular guide device 60 carried parallel to the carriage guides 12, by horizontal racks 61; each rack 61 is supported by a pair of lower wheels 62 and a pair of upper toothed wheels 63 which engage with the teeth of said rack 61. One of the racks is connected to a control cylinder 64 and, correspondingly, one of the toothed wheels 63b is connected to the toothed wheels 63b of the other racks by means of a shaft 65.

The racks also support two tubular members 66 and 67 in which run the two runs of the chain 68 driven by the motor 69 by means of the driving wheels 70 and 71; the chain 68 is connected at its ends to a cylindrical element 72 which slides inside the tubular member 66 for the entire stroke of the pushing rod 73, for the bars to be fed to the machine tool. The pushing rod 73 running in the tubular member 60, is fixed, for example screwed, to a cylindrical element 74 movable along the tubular member 60. The two tubular members 60 and 66, on facing sides, have a longitudinal slot for the running of an arm or of an intermediate plate 75 connecting the sliding elements 72 and 74. In this way, by driving the chain 68 by means of the motor 69, it is possible to move the pushing rod 73 backwards and forwards along its tubular guide 60; at the same time the assembly of tubular members, carried by the racks 71, can be moved horizontally between a forward position in which the pushing member 73 is axially aligned with a bar to be fed in the carriages 12, as represented schematically by dotted lines in FIG. 7, in which it is inserted between the guides 11 of the carriages, and a retracted position outside said guides.

What is claimed is:

1. A bar feeding device for machine tools comprising: a support structure having a longitudinal axis, slide guides for at least a first and a second carriage rotatably supporting a bar to be fed and guided toward a machine tool mandrel, first control means to move said carriages along said slide guides parallel to said axis, said device further comprising first and second bar pushing means (20a and 30, 41) for pushing a bar along said axis, said first pushing means (20a) being provided on one of said carriages and remaining always on said axis, and second control means to move said second pushing means independently of said first pushing means, said second pushing means and second control means being movably supported on said support structure for movement between an inoperative position in which said second pushing means is laterally offset from said axis and an operative position in which said second pushing means is aligned with said axis.

2. A device as claimed in claim 1, wherein said first pushing means (20a) has a hole therethrough that lies always on said axis, and said second pushing means is a rod (30) that moves through said hole and contacts said bar to continue feeding said bar which has previously been moved by said first pushing means (20a).

3. A device as claimed in claim 1, in which said second pushing means is in the form of a tubular element having a longitudinal slot, a rod slidable in said tubular element and having a shank projecting outwardly from said slot, and drive means engaging the shank to move the rod within the tubular element.

4. A device as claimed in claim 1, in which said second pushing means is mounted for vertical swinging movement about a second axis parallel to the first-mentioned axis.

5. A device as claimed in claim 1, in which said second pushing means includes an upwardly opening channel-shaped cradle, and a rod (41) slidable lengthwise in said cradle, said cradle being parallel to said axis.

6. A device as claimed in claim 1, in which said second control means comprises a rack engageable with a pinion on said second pushing means for swinging said second pushing means vertically into and out of alignment with said axis, and power means to move said rack to rotate said pinion.

* * * * *